Jan. 3, 1950   J. N. BLAIR   2,492,957
ANIMAL TRAP
Filed Sept. 17, 1947   3 Sheets-Sheet 1

INVENTOR.
JOSEPH N. BLAIR
BY
J. S. Murray
ATTORNEY

Jan. 3, 1950     J. N. BLAIR     2,492,957
ANIMAL TRAP

Filed Sept. 17, 1947     3 Sheets-Sheet 2

INVENTOR.
JOSEPH N. BLAIR
BY
*JC Murray*
ATTORNEY

Jan. 3, 1950 J. N. BLAIR 2,492,957
ANIMAL TRAP
Filed Sept. 17, 1947 3 Sheets-Sheet 3

INVENTOR.
JOSEPH N. BLAIR
BY
ATTORNEY

Patented Jan. 3, 1950

2,492,957

UNITED STATES PATENT OFFICE 2,492,957

ANIMAL TRAP

Joseph N. Blair, Detroit, Mich.

Application September 17, 1947, Serial No. 774,632

8 Claims. (Cl. 43—81)

This invention relates to animal traps and particularly traps serving to kill a trapped animal.

An object of the invention is to provide an improved trip mechanism for the spring-actuated striker of an animal trap.

Another object is to equip an animal trap with an enclosure forming a passage for the approach of an animal to a tripping lever and to adapt a striker, when released by said lever, to swing down through the enclosure and take effect therein.

Another object is to dispose a bait holder centrally upon a suitable base and to mount a plurality of traps on such base affording animal passages radiating from said holder.

Another object is to adapt an animal trap to be inserted beneath a garbage can and to be interlocked with and serve as a base for said can.

These and various other objects are attained by the construction hereinafter described and illustrated in the accompanying drawings, wherein.

Figure 1:
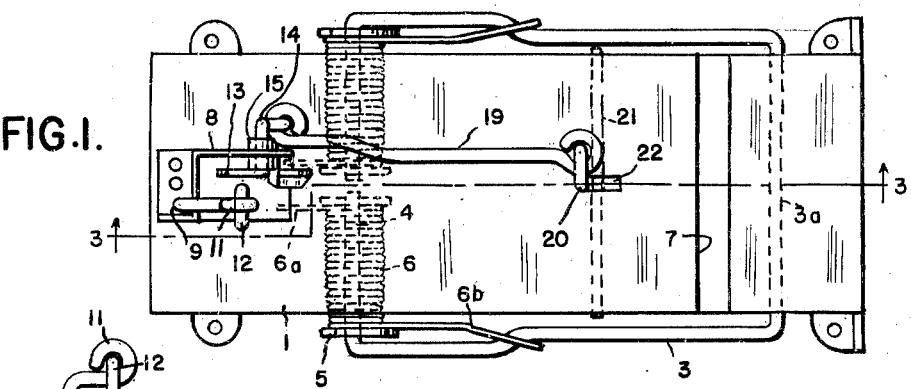
Fig. 1 is a top plan view of my improved trap, showing its striker in released position.
Figure 2:
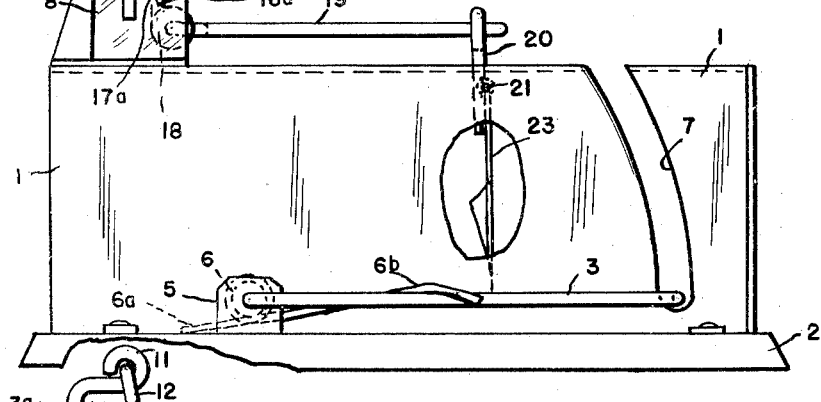
Fig. 2 is a side elevational view of the same.
Figure 3:
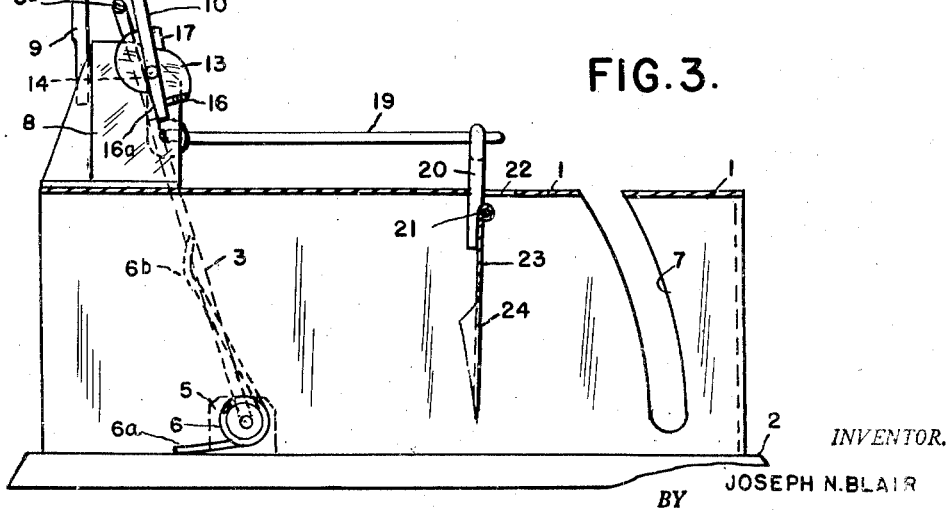
Fig. 3 is a longitudinal vertical sectional view, taken on the line 3—3 of Fig. 1 and showing the striker in set position.
Figure 4:
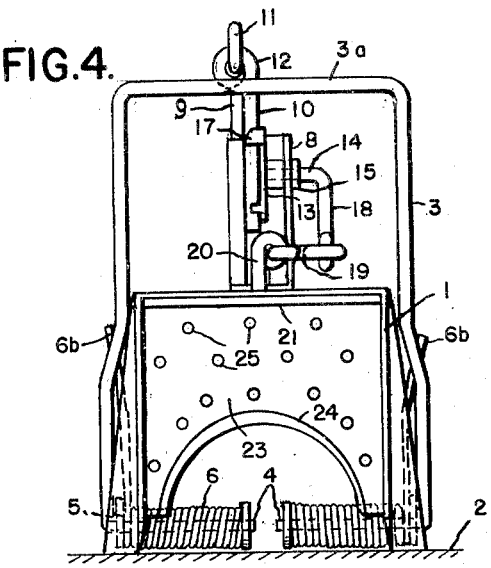
Fig. 4 is a front view of the trap as shown in Fig. 3.
Figure 5:
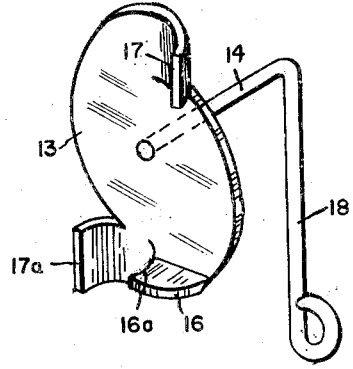
Fig. 5 is a perspective view of a latch member for the striker.

In the trap illustrated by Figs. 1–5, an elongated rectangular open-ended sheet metal enclosure 1 is secured in any desired manner to a base 2. Straddling the rear portion of said enclosure is a substantially U-shaped striker 3, its yoke portion forming a striking bar 3a. The striker may be formed of stiff wire, and has aligned extensions 4 from its ends, journaled in a pair of brackets 5 fixed on the base at opposite sides of the enclosure. The extensions 4 carry coiled springs 6 within the enclosure 1, each having an end portion 6a projecting rearwardly and stressed against the base, and having its other end portion 6b stressing the striker forwardly and downwardly. The forward portion of the enclosure is downwardly arcuately slotted at 7 to permit the striking bar of the striker to enter the lower front portion of the enclosure. A sheet metal bracket 8 rigidly surmounting the rear end of the enclosure has a wire element 9 rigidly upwardly projecting therefrom and serving as a hanger for an arm 10 for holding the striker in set position. Relatively transverse interengaged eyelets 11 and 12 formed respectively on the hanger 9 and arm 10, afford said arm a limited universal play. In exercising its function, the arm 10 extends downwardly across the striking bar, resisting the effort of the springs 6. A latch member 13 for holding the arm 10 in set position is centrally fixed on an end of a rock shaft 14 journaled in a bearing 15 carried rigidly by the bracket, said rock shaft being transverse to the enclosure 1. Said latch member is formed of stiff sheet metal and has a lug 16 serving as a keeper for the arm 10. Said lug presents to the arm 10 an arcuately recessed edge 16a (see Fig. 5) from which the arm may be readily released when swung transversely of the enclosure. The latch member also comprises a pair of upper and lower curved lugs 17 and 17a which oppositely engage the setting arm, upon rocking of the latch member to deflect it clear of the keeper 16.

To effect rocking of the latch member, the rock shaft 14 has a downwardly bent end 18 pivotally engaged by a forwardly extending wire link 19. The forward end of said link is pivoted above the enclosure to the upper end of a trip lever comprising a wire portion 20 projecting above the pivot pin 21 of said lever and through a slot 22 in the enclosure top. Said pivot pin extends transversely of the enclosure in its top portion, and the trip lever comprises a plate 23 depending from said pin, and obstructing the animal passage formed by the enclosure. In the lower portion of the plate 23, interrupting the lower edge of the plate is an opening 24, through which an animal may insert its head and the margin of such opening is flanged rearwardly to resist withdrawal of the animal's head. As will presently appear, bait may be disposed adjacent the rear end of the enclosure and the plate 23 is preferably perforated, as at 25, to more readily transmit the odor of the bait to the entrance of the enclosure.

In use of the described trap, the striker is held in set position, as has been described, by the setting arm 10, which is in turn held in place by the latch member 13. An animal entering the front end of the enclosure encounters the plate 23 and in attempting to pass such plate swings it slightly to the rear. Such swinging transmits through the link 19 a slight rocking travel to the latch member 13, whereby the arm 10 is deflected clear of the keeper 16. This permits the striker to snap down, responsive to the springs 6, and the bar 3a forcefully encounters the neck or back of the animal, instantly killing the latter.

Figure 6:
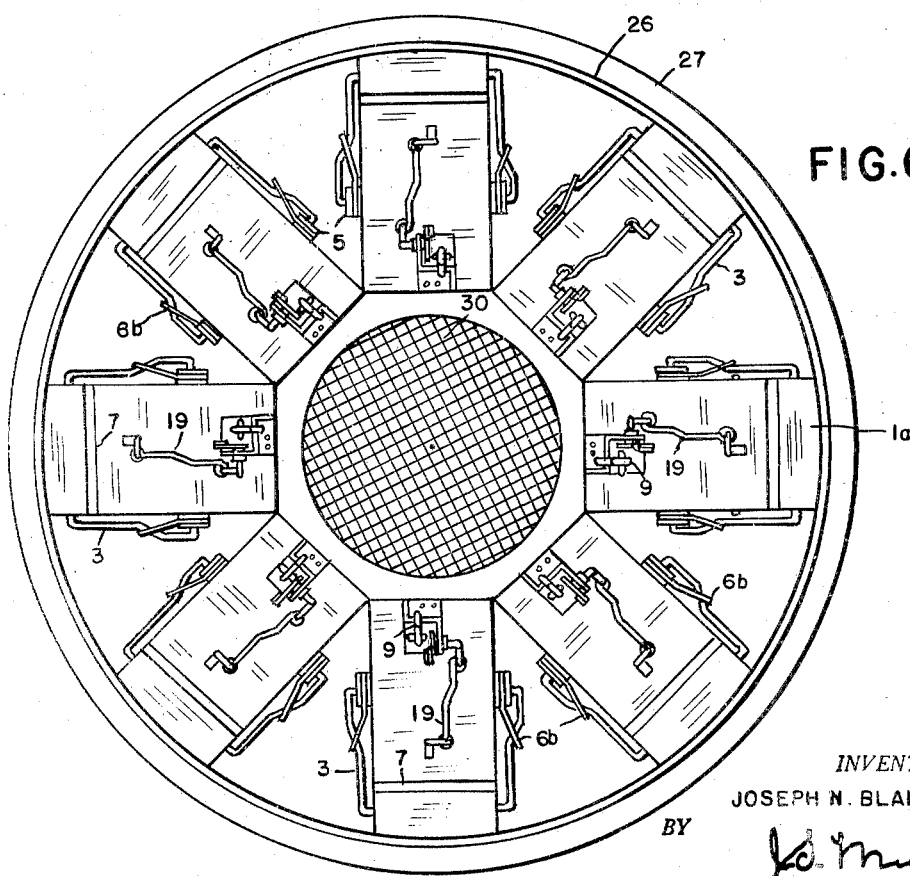
Fig. 6 is a top plan view of a multiple trap combining a plurality of the mechanisms illustrated by Figs. 1–5.
Figure 7:
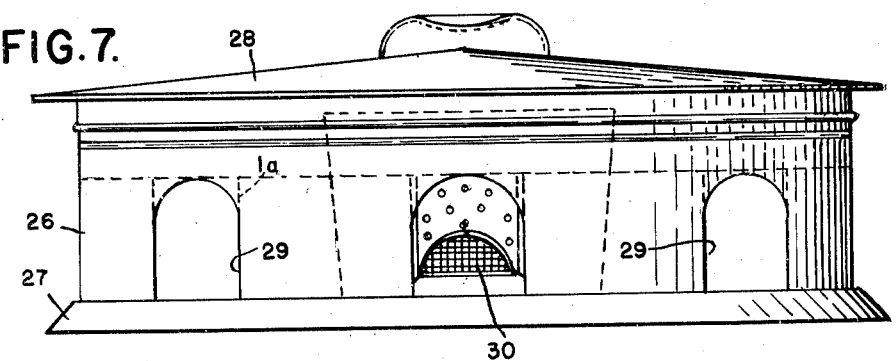
Fig. 7 is a side elevational view of said multiple trap, with a cover applied thereto.

The multiple trap shown in Figs. 6 and 7 comprises a circular casing 26 including a base 27, and having a removable cover 28. In its peripheral wall, the casing has a plurality of animal inlets 29, preferably equally spaced. From each inlet 29 an elongated enclosure 1a, such as has been described extends radially inward and with each enclosure is associated all the mechanism illustrated in Figs. 1-5. The inner ends of the enclosures 1a jointly form a central chamber in the casing 26, and a foraminous bait receiver 30 is disposed in such chamber.

Figure 9:
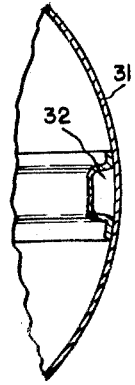
Fig. 9 is a fragmentary sectional view taken on the line 9—9 of Fig. 8.
Figure 8:
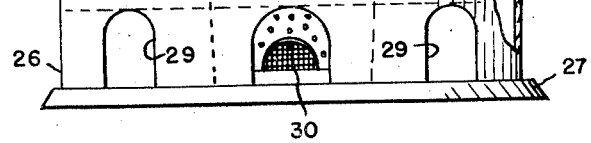
Fig. 8 is a side elevation of said multiple trap serving as a base for a garbage can.

In the construction shown by Figs. 8 and 9, a multiple trap such as has just been described is fitted beneath a garbage can 31, the cover 28 being of course omitted. The lower end portion of the wall of the can 31 extends sufficiently below the can bottom to receive the top portion of the casing 26, and assist in maintaining the can centered on the trap. In order that the odor of the garbage may be transmitted to the trap, an open-topped passage 32 is interiorly extended from the upper portion to the bottom of the can and is radially extended on the bottom, the latter having a central opening 33 through which said passage communicates centrally with the casing 26. Thus the passage 32 may transmit garbage odors to the trap from the upper portion of the can, rendering baiting of the trap superfluous.

The described trap has been found highly effective in catching and killing rats, this being its primary utility.

What I claim is:

1. An animal trap comprising a base, a striker having a striking bar substantially parallel to said base and a pair of spaced swinging arms interconnected by said bar, means on the base establishing a pivotal axis for said arms, substantially parallel to the striker bar, a spring urging the striker about said axis toward the base, a setting arm for the striker, means pivoting said arm to be swung across the striking bar, in a raised position of the striker for maintaining such position, a rockable latch element having a keeper engageable, in one pivotal position of said element, with the setting arm to maintain the effective position of such arm, the latch element further having a deflector, effective, through a predetermined rocking of the latch element, to release the setting arm from the keeper, a lever for tripping the latch element to its released position, means pivoting said lever to swing in proximity to the base to and from the set position of the striker, and a swinging link connecting the tripping lever operatively to the latch element.

2. An animal trap as set forth in claim 1, said tripping lever being positioned to be straddled by the striker arms, in swinging travel of the striker.

3. An animal trap as set forth in claim 1, said tripping lever having an arm downwardly extending from the lever pivot for animal actuation, and having a relatively short arm upwardly projecting from said pivot for engagement by said swinging link.

4. An animal trap as set forth in claim 1, said tripping lever comprising a plate downwardly extending from the lever pivot, and having its lower portion apertured to accommodate the head of an animal to be trapped.

5. An animal trap as set forth in claim 1, said setting arm being pivoted to swing transversely to the striking bar for engaging and releasing such bar and to also swing in substantial parallelism with the striking bar to release such arm from the keeper of the latch element, the rocking axis of the latch element being substantially parallel to the striking bar.

6. In an animal trap as set forth in claim 1, an enclosure providing an animal approach to the tripping lever, such enclosure surmounting the base, and being straddled by the arms of the striker and being downwardly slotted to accommodate the striking bar.

7. An animal trap comprising a base, an enclosure surmounting said base having an animal inlet and forming a passage extending from such inlet, a tripping lever obstructing said passage in a spaced relation to said inlet, means pivoting said lever adjacent to the top of said enclosure about an axis substantially transverse to said passage, a striker having a striking bar transverse to said passage and a pair of arms interconnected by said bar and straddling said enclosure, means pivoting said arms to swing about an axis transverse to said passage, such axis being more remote from the inlet than said tripping lever, a spring urging the striker about its pivotal axis toward the inlet, the enclosure being slotted between the tripping lever and inlet to admit said bar, means for latching the striker in a raised position, and a release mechanism for said latch means, operatively connected to the tripping lever.

8. An animal trap comprising a base, a bait container centrally disposed on said base, a plurality of enclosures surmounting said base and forming animal passages radiating outwardly from the bait container and having animal inlets at their outer ends, tripping levers respectively obstructing the respective passages in said enclosures, strikers releasable by the tripping levers, including striking bars downwardly actuable into the enclosures between their inlets and the corresponding tripping levers, spring-actuating means for the strikers, means for latching the strikers in raised positions, and release mechanisms for the latching means operatively connected to the tripping levers.

JOSEPH N. BLAIR.

REFERENCES CITED

The following references are of record in the file of this patent:

FOREIGN PATENTS

| Number | Country | Date |
|--------|---------|------|
| 307,663 | Italy | May 11, 1933 |